United States Patent [19]
Schulz et al.

[11] Patent Number: 6,074,448
[45] Date of Patent: Jun. 13, 2000

[54] DEVICE FOR USE IN FILTERING SEPARATORS

[75] Inventors: Peter Schulz, Willich; Joachim Wolff, Eschweiler, both of Germany

[73] Assignee: Thomas Josef Heimbach Gesellschaft mit beschrankter Haftung & Co., Germany

[21] Appl. No.: 09/058,155

[22] Filed: Apr. 10, 1998

[51] Int. Cl.[7] .......................... B01D 29/66; B01D 46/04
[52] U.S. Cl. ..................... 55/286; 55/294; 55/302; 96/421; 96/422; 96/428
[58] Field of Search ........................... 55/284, 286, 294, 55/302; 96/421, 422, 427, 428

[56] References Cited

U.S. PATENT DOCUMENTS

| | | | |
|---|---|---|---|
| 1,830,098 | 11/1931 | Dollinger . | |
| 3,394,532 | 7/1968 | Oetiker | 55/302 |
| 3,482,378 | 12/1969 | Noland | 55/302 X |
| 3,665,547 | 5/1972 | Boylan | 15/406 |
| 3,735,566 | 5/1973 | Laliwala | 55/302 X |
| 3,798,878 | 3/1974 | Pausch | 55/302 X |
| 4,299,597 | 11/1981 | Oetiker et al. | 96/427 X |
| 4,433,986 | 2/1984 | Borst | 96/428 |
| 4,491,458 | 1/1985 | Sunter | 55/284 X |
| 4,600,415 | 7/1986 | Barton | 55/294 |
| 4,686,848 | 8/1987 | Casselberry et al. | 73/38 |
| 5,361,452 | 11/1994 | Horn | 15/406 |
| 5,417,728 | 5/1995 | Royle | 55/302 |
| 5,882,379 | 3/1999 | Johnson | 55/302 X |

FOREIGN PATENT DOCUMENTS

| | | |
|---|---|---|
| 0046740 | 3/1982 | European Pat. Off. . |
| 4309302 | 3/1993 | Germany . |

*Primary Examiner*—Robert H. Spitzer
*Attorney, Agent, or Firm*—Liniak, Berenato, Longacre & White, LLC

[57] ABSTRACT

A device adapted to indicate the degree to which a filter is soiled is provided, for use in filtering separators of the type having bag-, pouch-, or cartridge-shaped filters. The device has a hose- or tube-shaped air conveyance section. The air conveyance section has at one end a surface contact fitting. An air conveyor is arranged in the air conveyance section. The air conveyor generates an air flow in at least one direction. A pressure gauge is associated with the air conveyance section. The pressure gauge senses and displays the pressure in the airflow. The air conveyance section is equipped with at least one of an air flow meter and an air volume meter with a display. The device is configured as a portable unit. Preferably, the device also includes a dedusting device. The dedusting device has a hose- or tube-shaped dedusting air conveyance duct. The dedusting air conveyance duct has at one end the aforementioned surface contact fitting. A valve is arranged in the dedusting air conveyance duct. The dedusting air conveyance duct has a compressed air connection on a side of the valve facing away from the surface contact fitting. The dedusting device preferably is also configured as a portable unit.

21 Claims, 3 Drawing Sheets

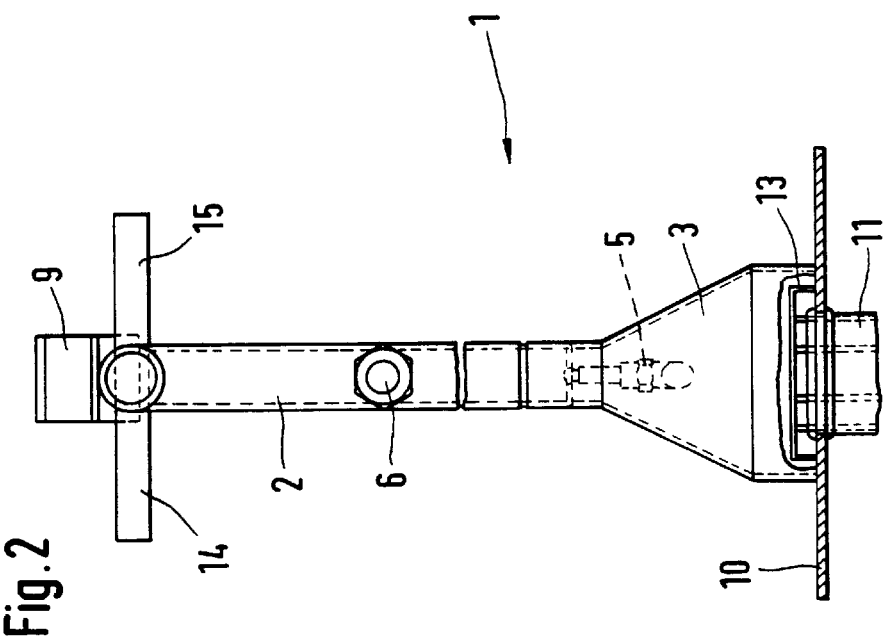
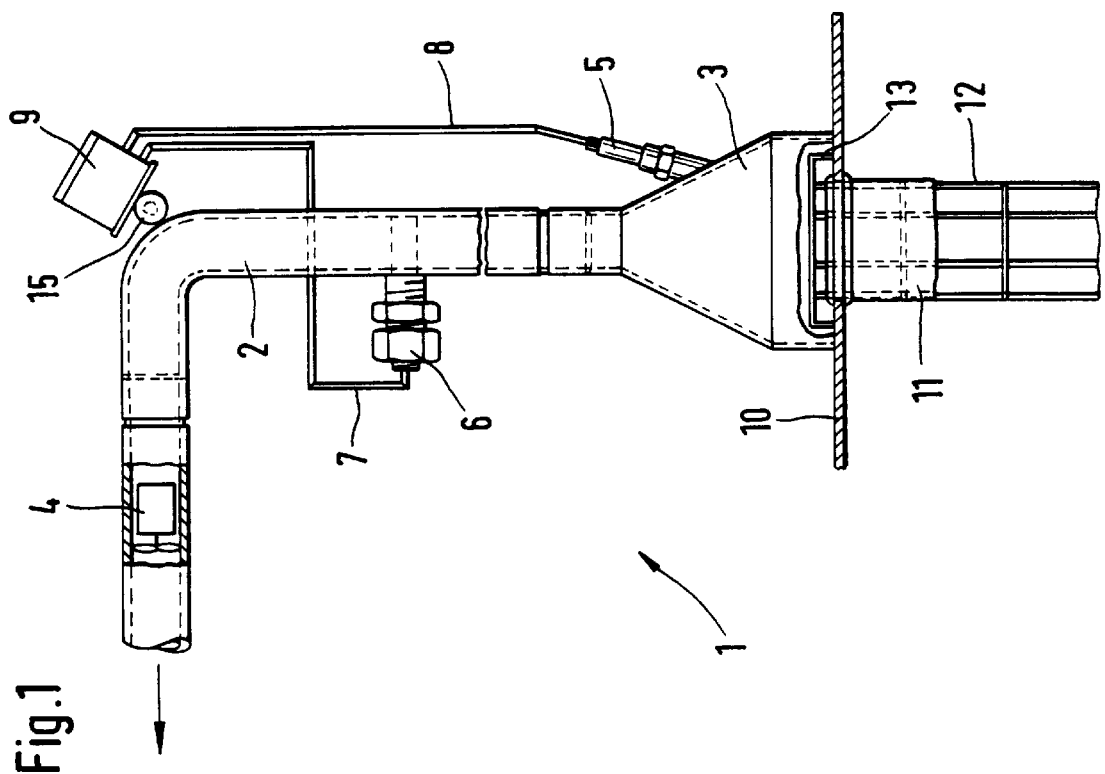

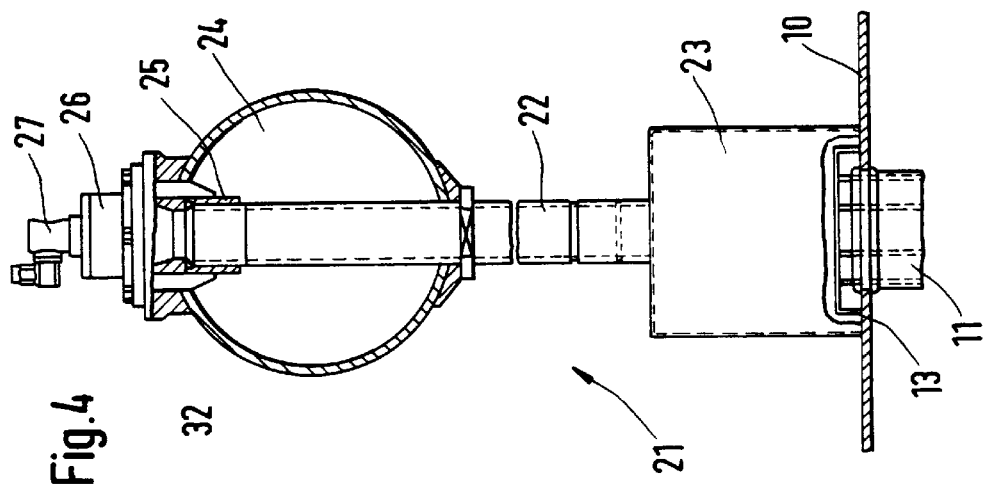
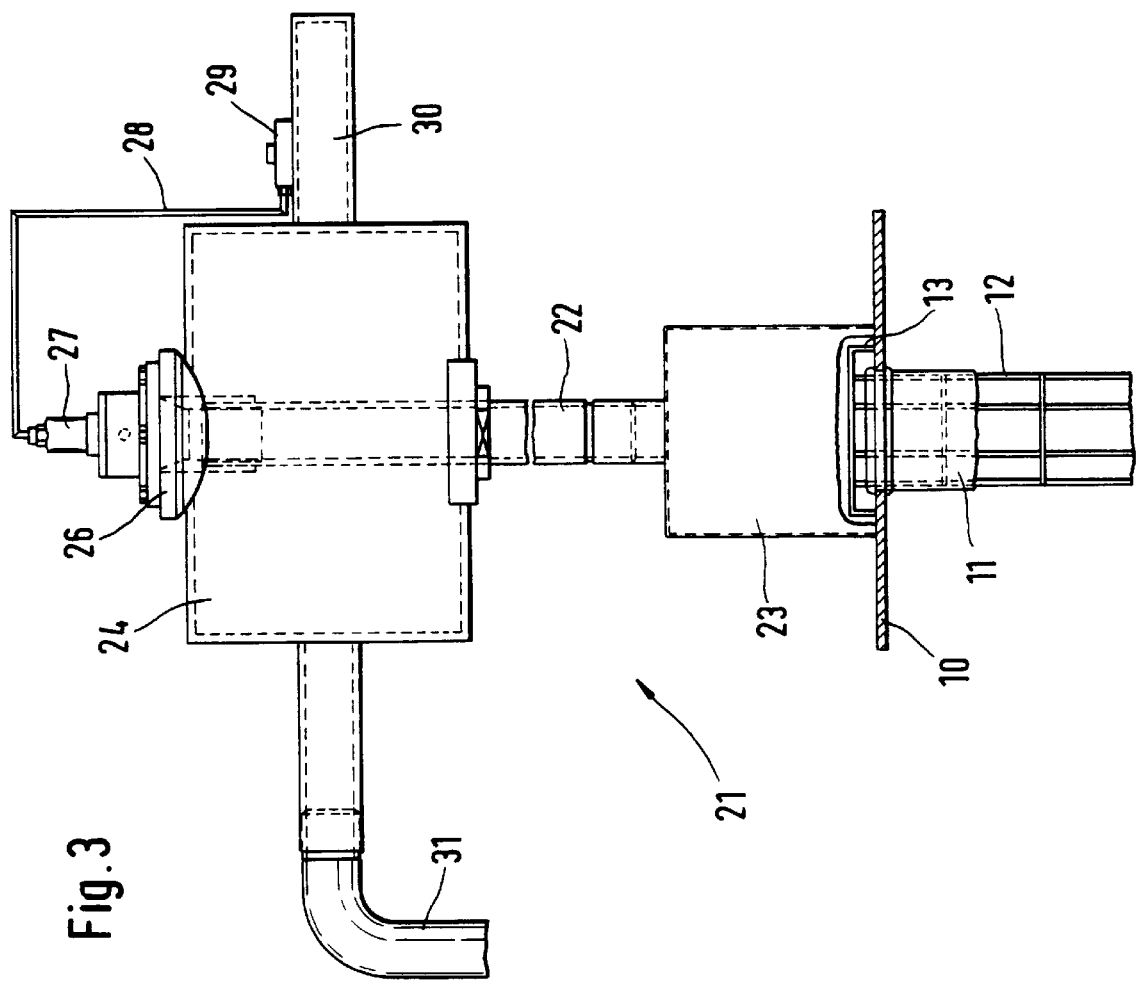

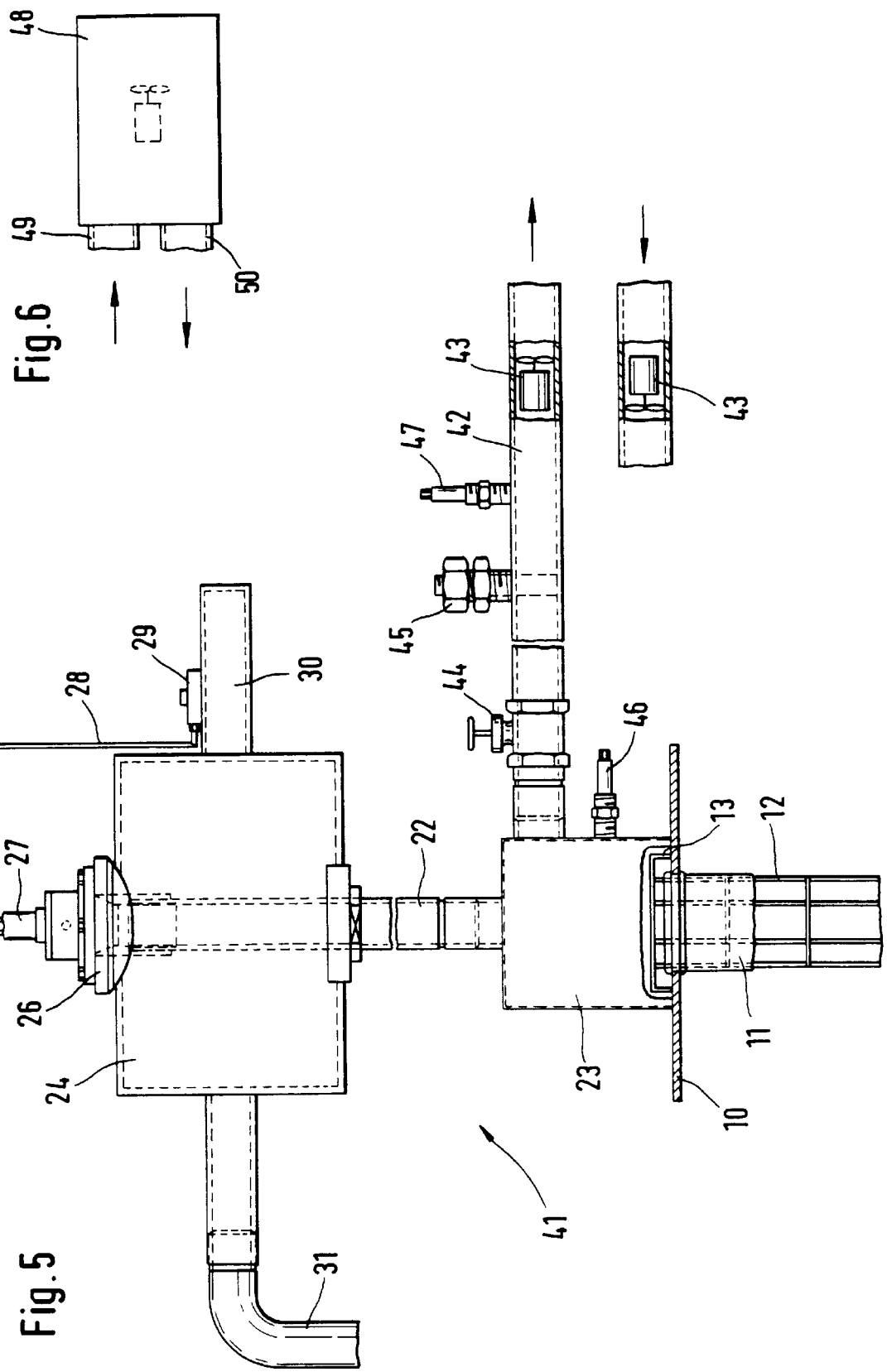

DEVICE FOR USE IN FILTERING SEPARATORS

BACKGROUND OF THE INVENTION

The invention concerns a device for use in filtering separators with, in particular, bag, pouch-, or cartridge-shaped filtering means.

In order to measure the air permeability of soiled filter bags, the relevant filter bag must be removed, packaged, and shipped to the laboratory which performs such measurements. In the often long period between removal and laboratory examination, the filter bag and the dust adhering to it are subject to considerable changes. This is due on the one hand to environmental influences, in particular the action of atmospheric humidity. On the other hand, the dust cake is destroyed as the filter bag is flexed and rolled up during and after removal. For these reasons, the air permeability values measured in the laboratory can be only imprecisely evaluated, and even then only with reference to previous examinations. The performance of the system can be indicated only vaguely, and in consideration of values gained by experience.

Heavily soiled or encrusted filter bags can at present be cleaned only by being subjected to dry or wet cleaning outside the filtration system, i.e. after they are removed. The same expenditure of time and money is therefore involved as for a complete change of the filter bag. In the case of a wet wash, the filter bag must be transported, wet-washed, and dried. Suitable working spaces are required for this, along with the use of personal safety clothing so as to protect persons working with it from the filter dust, which in some case is also contaminated. In addition, the surface finish effected by calendering or singeing is largely lost. Surface coatings can also be irreversibly damaged. The filter bags moreover tend to shrink and become felted when wet-washed.

It is known to dedust filter bags in a filtration system by means of a permanently installed pulse-jet system, by generating compressed air pulses simultaneously, via small nozzles, in all the filter bags. This type of dedusting is of only limited effectiveness, however, and therefore also cannot replace dry or wet cleaning outside the filtration system.

SUMMARY OF THE INVENTION

It is the object of the invention to make available a device for use in filtration systems with which filtering means, e.g. filter bags, can be serviced in situ, i.e. in the filtration system itself, and in particular the air permeability can be measured and/or effective dedusting can be accomplished.

This object is achieved, according to the invention, by means of a device having the following features:
   a) the device has a hose- or tube-shaped air conveyance section;
   b) the air conveyance section has at one end a surface contact fitting;
   c) an air conveyor, to generate an air flow in at least one direction, is arranged in the air conveyance section;
   d) at least one pressure gauge, to sense and display the pressure in the air flow, is associated with the air conveyance section;
   e) the air conveyance section is equipped with an air flow meter and/or an air volume meter with a display;
   f) the device is configured as a portable unit.

The basic concept of the invention consists in providing a movable device which is placed onto the upper end of, for example, a filter bag, and with which an air flow can be generated by means of which the air permeability can be sensed, by means of a pressure gauge and an air flow meter and/or an air volume meter, with no need to remove the filter bag from the filtration system for the purpose. The air permeability of an entire filtering means is thus measured, taking into account all the features influencing air permeability, such as the cage, venturi, seams, sleeves, base, etc. The dust cake remains unaffected in the process. The results of the measurements are available immediately to the owner of the filtration system. They can be discussed on site, and immediate actions, for example to improve dedusting, can be planned, and additional tests can be performed. The operation of an internal dedusting system, for example a pulse-jet system, can also be checked directly, by measuring the air permeability before and after a dedusting operation. Air permeability can also be measured quickly for a plurality of filter bags, and a complete chamber screening operation can be set up.

The use of the device according to the invention is, of course, not limited to bag filters. With an appropriate configuration of the surface contact fitting, air permeability measurements can also be performed on other filtering separators.

In an embodiment of the invention, provision is made for the, or at least one, pressure gauge to be arranged in the region of the surface contact fitting. Advantageously, the air conveyance section should have a setting device for setting a specific pressure or volume flow. Multiple pressure gauges can also be provided.

Fans or compressed air ejectors are possible, in particular, as air conveyors.

For most applications, the air conveyor should be configured so that it generates an air flow from the surface contact fitting toward the air conveyor, i.e. a suction air flow. For cases in which air passes in reverse through the filtration system, the air conveyor should be capable of generating a compressed air flow toward the surface contact fitting. It is particularly advantageous if the air conveyor is designed to generate an air flow in both directions, since the device can then be used irrespective of the air flow in the filtration system.

Provision is furthermore made, according to the invention, for a dust detector with display to be incorporated into the air conveyance section. Dust particles in the extracted air flow can be detected and displayed by means of this dust detector.

The object of the invention is, however, also achieved by a device having the following features:
   a) the device has a hose- or tube-shaped air conveyance duct;
   b) the air conveyance duct has at one end a surface contact fitting;
   c) a valve is arranged in the air conveyance duct;
   d) the air conveyance duct has a compressed air connection on the side of the valve facing away from the surface contact fitting;
   e) the device is configured as a portable unit.

With this movable unit, it is possible, after connecting to a compressed air source, to generate pressure surges with which the filtering means can be dedusted. High pressures and large volumes of compressed air can thereby be generated, so that the device is highly effective. By this means it is even possible to detach larger agglomerations that cannot be dedusted with internal systems. The improvement in air permeability is up to 90%.

It is particularly advantageous to arrange, between the compressed air connection and valve, a compressed air reservoir which advantageously can be closed off toward the compressed air connection and/or has a reducing device to set the pressure in the compressed air reservoir. A particularly compact configuration for the device results if the compressed air reservoir surrounds the air conveyance duct between the valve and surface contact fitting.

The valve should definitely be configured in rapid-opening fashion, so that a high pressure peak can be generated. A magnetically actuated diaphragm valve is particularly suitable for this; the diaphragm actuation system should be configured adjustably in terms of the valve opening time.

The surface contact fitting should be such that it can be slipped over different opening sizes or types of filtering means, or for that purpose can be replaced with properly fitting surface contact fittings. An appropriate bell-shaped configuration is particularly suitable for this. Advantageously, the surface contact fitting has end-surface sealing elements.

The device can be used in particularly versatile fashion if it is configured as a combined device with which both air permeability can be measured and a dedusting operation can be performed, i.e. in which the device has the features of claims 1 and 9. In this case it is advantageous that the air conveyance section and air conveyance duct open into one another, so that the device has only one surface contact fitting for both functions. In this context, the air conveyance section and air conveyance duct can converge in the region of the surface contact fitting. To eliminate any interference with generation of a pressure surge in such cases, a shutoff valve, with which the air conveyance section can be blocked, should be installed in the air conveyance section.

BRIEF DESCRIPTION OF THE DRAWINGS

The invention is illustrated in more detail, with reference to exemplifying embodiments, in the drawings, in which:

FIG. 1 shows a device for measuring air permeability in a side view;

FIG. 2 shows the device of FIG. 1 in a front view;

FIG. 3 shows a device for dedusting filter bags in a side view;

FIG. 4 shows the device of FIG. 3 in a front view, with partial sectioned depictions;

FIG. 5 shows a combined device for air permeability measurement and dedusting, in a side view; and FIG. 6 shows an air conveyor for the device of FIG. 5.

DESCRIPTION OF PREFERRED EMBODIMENTS

Device 1 depicted in FIGS. 1 and 2 has an air conveyance tube 2 which ends at the bottom in a surface contact fitting 3. Toward the top, after running vertically, it bends over to the horizontal. A fan 4, which can generate a suction flow in air conveyance tube 2, is installed at that point.

A pressure sensor 5, with which the static pressure in surface contact fitting 3 and in air conveyance tube 2 can be measured, is located in surface contact fitting 3. A volumetric flowmeter 6 is installed approximately in the middle of the vertical portion of air conveyance tube 2. Pressure sensor 5 and volumetric flowmeter 6 are connected via leads 7, 8 to a data display 9 which is attached at the top elbow of air conveyance tube 2.

Surface contact fitting 3 sits on the top of a perforated plate 10 which belongs to a bag filtration system of ordinary design. Suspended from its perforated plate 10 are a plurality of filter bags, of which only the top end of one filter bag 11 is depicted here. Filter bag 11 is braced internally by a cage 12 which extends along its length, so that it cannot collapse. Cage 12 has at the top an edge support 13 which rests on perforated plate 10.

Surface contact fitting 3 is slipped over the top opening of cage 12 and filter bag 11 so as to effect an end-surface seal with perforated plate 10. A suction air flow can be generated in air conveyance tube 2, surface contact fitting 3, and filter bag 11 by means of fan 4. The static pressure is set, by means of a bypass arrangement (not depicted here in further detail) with a control valve arranged therein, to a specific value which can be read off via pressure sensor 5 and data display 9. The volume flow which is then established is sensed by volumetric flowmeter 6 and also displayed by data display 9, and is then an indication of the degree to which filter bag 11 is soiled. The reverse procedure can also be used, namely by establishing a certain volume flow and then reading off the static pressure on data display 9.

Because of its simple design, the device is portable, i.e. can easily be placed on the filtration system and moved thereon from one filter bag 11 to another. Assisting in this context are handles 14, 15 which are mounted at the elbow of air conveyance tube 2, and on which data display 9 is placed.

Device 21 depicted in FIGS. 3 and 4 is used for dedusting. It has a vertical, elevated air conveyance duct 22 which ends at the bottom in a cylindrical surface contact fitting 23. Toward the top, air conveyance duct 22 passes through a cylindrical compressed air reservoir 24 and ends at the top in a valve fitting 25 of a diaphragm valve 26. Diaphragm valve 26 has a magnetic actuator 27 which is connected via a lead 28 to a button switch 29 by means of which magnetic actuator 27 can be activated. Button switch 29 sits on a horizontal bar 30 which is attached to the right side of compressed air reservoir 24 and is used for handling device 21.

A connector duct 31, which opens into compressed air reservoir 24, is attached on the side of compressed air reservoir 24 facing away from bar 30. Compressed air reservoir 24 can be connected via connector duct 31 to a compressed air source, for example a main compressed air tank or a compressed air duct. Compressed air can be applied in this fashion to compressed air reservoir 24. A reduction valve to establish the pressure is arranged between compressed air reservoir 24 and the compressed air source.

Device 21 sits with surface contact fitting 23 on perforated plate 10. Reference is made to the exemplifying embodiment as shown in FIG. 1 for a description of perforated plate 10 and filter bag 11, with cage 12 and edge support 13, suspended therefrom.

For a dedusting operation, button switch 29 is actuated. This activates magnetic actuator 27, causing diaphragm valve 26 to open abruptly. As a result, compressed air passes from compressed air reservoir 24 through an annular-conduit 32 surrounding valve fitting 25 into diaphragm valve 26, and from there into air conveyance duct 22 and surface contact fitting 23 and into filter bag 11. As a result of the pressure pulse, filter bag 11 is suddenly inflated and purged by the inflowing compressed air, resulting in detachment of an externally adhering dust cake. This operation can be repeated several times by opening and closing diaphragm valve 26. The opening time of diaphragm valve 26 can be set by means of a control system (not depicted here), i.e. when button switch 29 is actuated, diaphragm valve 26 opens only for a specific time.

Device 41 depicted in FIG. 5 constitutes, in terms of function, a combination of device 21 with device 1. Device 21 is utilized in identical fashion for this purpose, so that the same reference numbers are used, and reference is made to the description of said device 21 in accordance with FIGS. 3 and 4. The same also applies to perforated plate 10 with filter bag 11.

A horizontal air conveyance tube 42, in the end of which a fan 43 is located, is connected to surface contact fitting 23 via a flexible connecting duct. A quick-acting valve 44 is installed in air conveyance tube 42 near surface contact fitting 23. A volumetric flowmeter 45 is located between quick-acting valve 44 and fan 43. A first pressure sensor 46 is also arranged in surface contact fitting 23, and a second pressure sensor 47 is arranged in air conveyance tube 42 between quick-acting valve 44 and fan 43. Both volumetric flowmeter 45 and pressure sensors 46, 47 are connected via leads (not depicted here) to a data display (also not depicted here). Also located in air conveyance tube 42 is a dust detector with display, for detecting dust particles in the drawn-in air flow.

In the installed state depicted, an air permeability measurement can be performed with device 41. For this, quick-acting valve 44 is opened and fan 43 is started. A specific differential pressure is established by means of pressure sensor 46, 47 and a bypass arrangement (not shown). The volume flow in air conveyance tube 42 is sensed via volumetric flowmeter 45. Its value corresponds to the air permeability of filter bag 11, and thus to its degree of soiling.

After this measurement has been performed, air conveyance tube 42 is closed off by means of quick-acting valve 44. Magnetic actuator 27 is activated by actuation of button switch 29, and diaphragm valve 26 is opened in the manner already described. Compressed air shoots into filter bag 11 at high pressure and momentum, and dedusts it. After dedusting, quick-acting valve 44 is opened again and the air permeability or volume flow is measured again. The difference between the two air permeability measurements yields the degree of dedusting. In addition, the volume flow can be used to purge and thus clean filter 11, both during and after pressure pulse cleaning.

Below fan 43 installed in air conveyance tube 42, the same fan 43 is depicted delivering in the opposite direction. This is intended to elucidate the fact that fan 43 is installed in air conveyance tube 42 in such a way that it can also be mounted in reverse. As a result, device 41 can also be used in filtration systems in which the flow-through direction in filter bag 11 is reversed, i.e. flow occurs through filter bag 11 from inside to outside, and it consequently accumulates dust on the inside.

Instead of this design, it is also possible to use a fan 48 as shown in FIG. 6, which has an inlet fitting 49 and an outlet fitting 50 on the same side. Depending on the flowthrough direction in filter bag 11, fan 48 can be connected to air conveyance tube 42 at either inlet fitting 49 or outlet fitting 50.

What is claimed is:

1. A device for use in filtering separators with bag-, pouch-, or cartridge-shaped filtering means, characterized by the following features:
   a) the device has a hose- or tube-shaped air conveyance section;
   b) the air conveyance section has at one end a surface contact fitting;
   c) an air conveyor, to generate an air flow in at least one direction, is arranged in the air conveyance section;
   d) a pressure gauge, to sense and display the pressure in the air flow, is associated with the air conveyance section;
   e) the air conveyance section is equipped with at least one of an air flow meter and an air volume meter with a display; and
   f) the device is configured as a portable unit.

2. The device as defined in claim 1, wherein the pressure gauge is arranged in the region of the surface contact fitting.

3. The device as defined in claim 1, wherein the air conveyance section has a setting device for setting a specific pressure or volume flow.

4. The device as defined in claim 1, further comprising at least one additional pressure gauge.

5. The device as defined in claim 1, wherein the air conveyor is configured as a fan or compressed air ejector.

6. The device as defined in claim 1, wherein the air conveyor is configured for generation of an air flow from the air conveyor toward the surface contact fitting.

7. The device as defined in claim 6, wherein the air conveyor is configured for generation of an air flow in both directions.

8. The device as defined in claim 1, wherein the air conveyor is configured for generation of an air flow from the surface contact fitting toward the air conveyor.

9. The device as defined in claim 7, wherein a dust detector with display is incorporated into the air conveyance section.

10. The device of claim 1, further comprising a dedusting device characterized by the following features:
    a) the dedusting device has a hose- or tube-shaped dedusting air conveyance duct;
    b) the dedusting air conveyance duct has at one end said surface contact fitting;
    c) a valve is arranged in the dedusting air conveyance duct;
    d) the dedusting air conveyance duct has a compressed air connection on a side of the valve facing away from the surface contact fitting; and
    e) the dedusting device is configured as a portable unit.

11. The device as defined in claim 10, wherein a compressed air reservoir is arranged between the compressed air connection and valve.

12. The device as defined in claim 11, wherein the compressed air reservoir can be closed off toward the compressed air connection.

13. The device as defined in claim 11, wherein the compressed air reservoir surrounds the dedusting air conveyance duct between the valve and the surface contact fitting.

14. The device as defined in claim 10, wherein the valve is configured as a diaphragm valve.

15. The device as defined in claim 10, wherein the valve has a magnetic actuator with adjustable opening time.

16. The device as defined in claim 10, wherein the air conveyance section and the dedusting air conveyance duct open into one another.

17. The device as defined in claim 16, wherein the air conveyance section and the dedusting air conveyance duct converge in the region of the surface contact fitting.

18. The device as defined in claim 16, wherein the air conveyance section has a shutoff valve.

19. The device as defined in claim 1, wherein the surface contact fitting is configured in a bell shape.

20. The device as defined in claim 1, wherein the surface contact fitting has end-surface sealing elements.

21. A portable device for in situ detecting the air permeability of a filter that is bag-, pouch- or cartridge-shaped while the filter is mounted to a filtering separator, said device comprising:

a hose- or tub-shaped air conveyance section;

a surface contact fitting located at one end of the air conveyance section and adapted to engage the filter while the filter remains mounted to the filtering separator, whereby the filter need not be removed in order to detect the air permeability thereof;

an air conveyor adapted to generate an air flow in at least one direction, said air conveyor being arranged in the air conveyance section;

a pressure gauge adapted to sense and display the pressure in the air flow, said pressure gauge being associated with the air conveyance section; and an air flow meter or air volume meter with a display, associated with said air conveyance section.

\* \* \* \* \*